United States Patent [19]

Hartmann et al.

[11] 4,420,320

[45] Dec. 13, 1983

[54] METHOD OF BIOLOGICALLY DRYING WASTE MATERIAL

[75] Inventors: Randolph Hartmann, Karlsruhe; Helmut Schriewer, Maximiliansau, both of Fed. Rep. of Germany

[73] Assignee: Industrie-Werke Karlsruhe Augsburg Aktiengesellschaft, Fed. Rep. of Germany

[21] Appl. No.: 314,509

[22] Filed: Oct. 23, 1981

Related U.S. Application Data

[63] Continuation-in-part of Ser. No. 299,060, Sep. 3, 1981, abandoned, which is a continuation of Ser. No. 125,778, Feb. 29, 1980, abandoned.

[30] Foreign Application Priority Data

Sep. 27, 1979 [DE] Fed. Rep. of Germany ....... 2939229

[51] Int. Cl.³ .......................... C05F 7/00; C02C 3/00
[52] U.S. Cl. ......................................... 71/13; 71/901; 71/903; 110/228; 210/769; 44/1 D; 201/25
[58] Field of Search .............. 210/259, 307, 607, 609, 210/623, 626, 751, 758-761, 769; 110/228; 71/8-10, 12, 13, 901, 903, 64.13; 44/1 D, 1 F, 10 K; 201/6, 25

[56] References Cited

U.S. PATENT DOCUMENTS 3,859,933 1/1975 von Klenck ................... 210/758 X
4,111,800 9/1978 Harinxma .............................. 201/25
4,191,643 3/1980 Kneer ............................ 210/623 X

FOREIGN PATENT DOCUMENTS 1145646 3/1963 Fed. Rep. of Germany .

OTHER PUBLICATIONS

"By Broad Potomac's Shore" The Water & Sewerage Systems of The District of Columbia, 2/1979, pp. 31 & 32.

Primary Examiner—Ferris H. Lander
Attorney, Agent, or Firm—McGlew and Tuttle

[57] ABSTRACT

A method of producing soil conditioners from waste material, and of utilizing the internal energy thereof, while reducing the volume of the waste material at the same time, is disclosed in which initially compacts of a refuse-sludge mixture are subjected to intense rotting whereby the water content thereof is reduced from an initial value of about 50 to 60 percent to about 30 percent, preferably 20 percent, and whereby the compacts become dried and storable. The dried and storable compacts are ground or screened, or both, with the screened out fine fraction being directly usable as a soil conditioner, and then the ground or screened, or both, compacts are thermally treated by one of low temperature carbonization and combustion.

1 Claim, 1 Drawing Figure

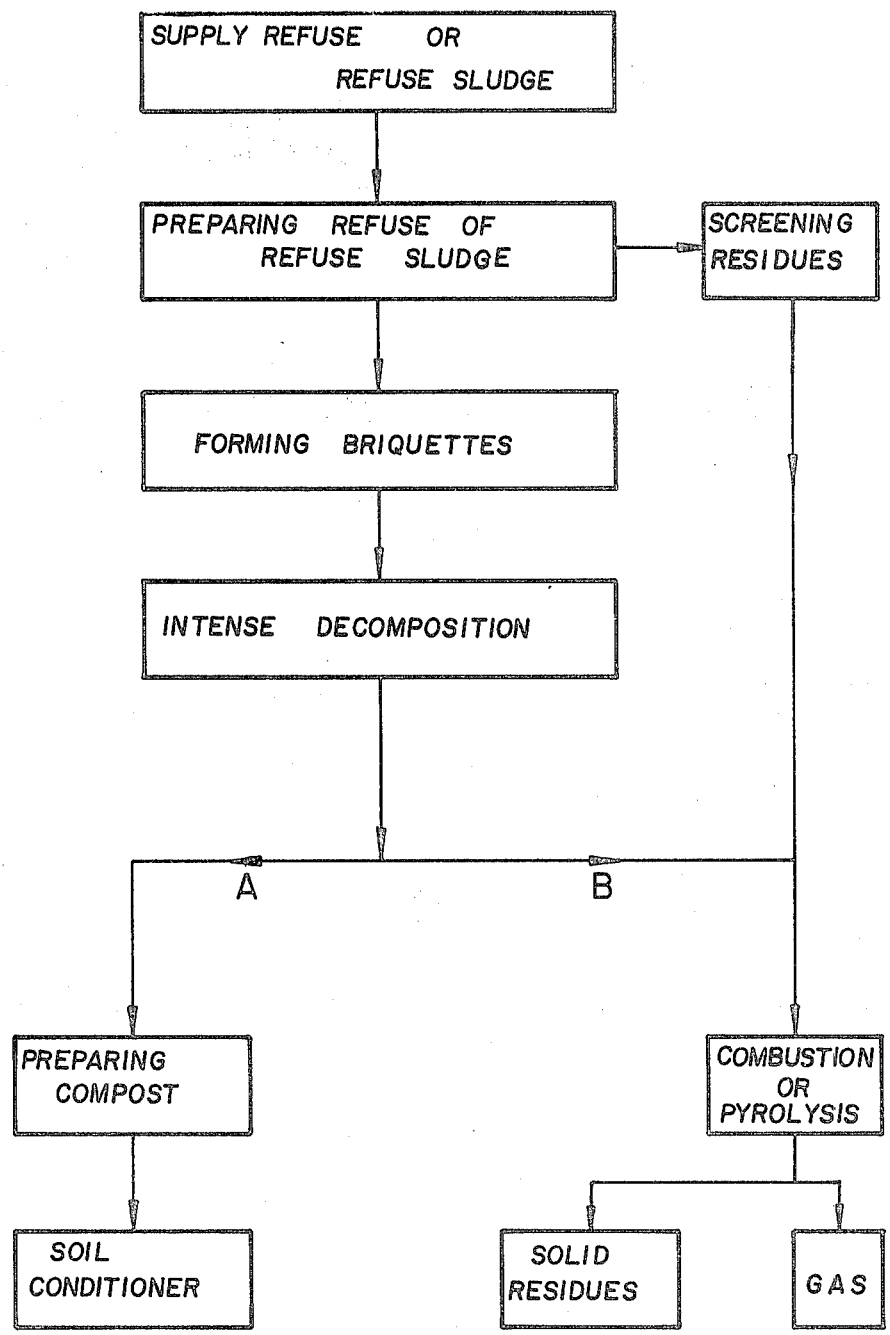

METHOD OF BIOLOGICALLY DRYING WASTE MATERIAL

This is a continuation-in-part of U.S. patent application Ser. No. 299,060 filed Sept. 3, 1981, and now abandoned which is a continuation of U.S. patent application Ser. No. 125,778, filed Feb. 29, 1980 (now abandoned).

FIELD AND BACKGROUND OF THE INVENTION

This invention relates in general to a method of treating waste material and in particular to a new and useful method of biologically drying waste material in order to obtain soil conditioners, and of utilizing the internal energy thereof, while at the same time reducing the volume of the waste material, and in which composts of a refuse-sewage sludge mixture are subjected to intense rotting whereby the water content thereof is reduced from an initial value of 50 to 60 percent to about 30 percent, and preferably 20 percent.

Both the growing occurrence of refuse of various nature and source and the increasing awareness among the population of the importance of environmental conditions help to realize what limits are set to the prior art methods of refuse disposal. These limits may particularly clearly be illustrated by the situation of refuse deposits: dumps are the simplest and insofar also the cheapest way of refuse disposal. In view of the necessary complying with regulations and other restrictions intended to protect people, animals, and the environment in general, it becomes noticeably more difficult for operators, for example, communities, to maintain such dumps. This means that the suitable deposit areas provided therefor become scarce. The distances between dumps and the settlement areas to be serviced also become larger. Similar criteria are to be applied to the costs of environmental protection, such as to avoid contamination of ground water, if additional or future damages are to be prevented.

Aside from the fact that dumps attract vermin and may become centers of epidemics, putrefaction may cause methane explosions etc. resulting in dump fires. Further, by dumping of refuse, variable unsorted raw materials get lost instead of being recycled in a useful and appropriate manner.

Certain natural limits are also set to composting refuse and refuse-sludge mixtures, even though composting methods have proved to be practical. One such very successful method is disclosed in German patent No. 11 45 646. According to this method, soil conditioners from refuse which are unaffected by storing and which are substantially odorless and biologically active can be produced by preparing and drying mixtures of refuse and sludge. This method is called "intense rotting" notwithstanding the fact that a lot of degradable, organic material remains undegraded by this known method.

While applying the method of the above cited German patent, a mixture of partly dehydrated sludge and comminuted refuse is compacted under strong pressure to about a third of its initial volume without water expulsion. The compacts thus obtained are then airdried. The substantially odorless material obtained is suitable as a biologically active substance for conditioning the soil, i.e., for initiating the composting process or continuous fermentation processes in the soil, as a biological fuel, for example for heating horticultural compost heaps, for superficial composting, heating hotbed frames (substitute for horse dung), for mulching, eliminating development of bad odors upon using fecal matter, in boneyards, etc., and can be employed as a soil conditioner (to mellow the soil) particularly in instances where the cultivation is endangered by de-humification, since it converts all the raw organic matter in the soil into humus, i.e., starts the natural process of humification. Due to the concentration of organic matter, in briquet form, the briquets have a calorific value of 1,700 to 2,000 kcal/kg and, should later their production exceed their need as conditioner, are such that they can readily and with a better efficiency be burned, without requiring special furnaces, thus at substantially lower costs as compared to the conventional, very expensive waste incineration. However, having reference to the size of the briquets (f. i. $5' \times 7.5' \times 8.2'$) a complete combustion is not to be experted in view of the short stay time in the furnace.

SUMMARY OF THE INVENTION

Considering the limits set to prior methods, the present invention is directed to a method which, on the one hand, complies with the requirements imposed on residential and/or industrial refuse and, on the other hand, minimizes the amount of obtained residual matter relevant to the process.

With the invention a refuse-sludge mixture is formed into compact elements such as briquettes. The briquettes are then subjected to the so-called intense rotting so that the water content is reduced to around 20% in order to form a more dry compacted elements. These dry and storable compacts are ground and/or screened. Thereafter the ground and/or screened compacts are thermally treated by either a low temperature carbonization (pyrolysis) or combustion.

The term "pyrolysis" in connection with refuse disposal requires some explanation. While combustion is a reaction between an oxidizable, mostly organic, substance and oxygen at an elevated temperature, by "pyrolysis", a thermal decomposition reaction is understood, of a product having a high carbon content, at an elevated temperature and with the exclusion of oxygen.

Pyrolysis is a relatively recent method in the art of refuse treatment. It is employed at a rapidly growing rate as an alternative to the conventional treatments such as combustion, composting, etc.

The pyrolitic treatment of solid refuse is usually aimed at three goals:
1. Refuse disposal only, i.e., maximum reduction of the refuse weight and volume, without any utilization;
2. Recovering heating gas; and
3. Recovering other products.

The invention offers a number of advantages:

The thermal treatment of ground and/or screened compacts by low-temperature carbonization (pyrolysis) or combustion, makes it possible to further process such compacts according to the above cited German patent, in the best and economical way. Grinding and/or screening provides for especially good efficiency of pyrolysis or combustion.

The inventive treatment also offers the advantageous possibility that the fine fractions from the rotting process, thus strongly decomposed organic components having a high content of mineral matter, can be readily used as soil conditioners since they are compatible with plants, while the coarse of the compacts fractions thus incompletely decomposed organic components only, are subjected to thermal treatment (pyrolysis or combustion).

Another advantage of the invention is the possibility of further processing the compacts of cited German patent No. 11 45 646 (so-called "Brikollare" compacts) in order to adapt to seasonal fluctuations in marketing the soil conditioners.

Finally, the invention solves also the problem of screening residues disposal, which residues result while preparing the refuse-sludge-mixture, by giving the possibility to add them to the material to be thermally treated. By screening residues in this connection, substantially organic components are to be understood which are difficult to decompose and are unsuitable for composting, such as plastics, textiles, paper, cardboard, wood and many others.

Accordingly, it is an object of the invention to provide a method of producing soil conditioners from waste material, and utilizing the internal energy thereof, while reducing the volume of the waste material at the same time, wherein initially the compacts of a refuse-sewage sludge mixture are subjected to intense rotting whereby the water content thereof is reduced from the initial value of about 50 to 60 percent to about 30 percent, and preferably 20 percent, in which the thereby dry and storable compacts are ground or screened, or both, with the screened-out fine fraction being directly usable as a soil conditioner, and then the ground or screened, or both, compacts are thermally treated by low temperature carbonization or combustion. If screening is provided, preferably only the coarse fraction remaining as oversize on the screen is thermally treated either directly or after a new compacting.

A further object of the invention is to provide a method which is simple to carry out and may be done economically.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWING

The only FIGURE of the drawing is a chart showing the steps carried out in accordance with the method of the invention.

DESCRIPTION OF THE PREFERRED EMBODIMENTS

Referring to the drawings in particular the invention embodied therein comprises a method of biologically drying waste material in order to obtain soil conditioners as well as to utilize the energy content of the material. The diagram indicated in the case shows both the conventional treatment as disclosed by a German patent No. 11 45 646 and the treatment in accordance with the present invention.

In both instances, the refuse and sludge mixture is first prepared and then pressed to compacts or briquettes in a press (not shown). The compacts in stacks or the like are subjected to a process of intense rotting. Further treatment may comprise an application of the method described in the above cited German patent No. 11 45 646, namely processing of the decomposed compost compacts to obtain a soil conditioner.

While carrying out the inventive method, the sequential operations of preparing the refuse-sludge mixture, forming the compacts, and intense rotting are identical with those provided in the cited German patent No. 11 45 646. However, the next steps are grinding and/or screening followed by the thermal treatment through low-temperature carbonization (pyrolysis) or combustion. If only grinding is applied, the following carbonization or combustion gives a better yield both with regard to gases and to energy. If only screening is applied the obtained fine fraction can be taken as a very good soil conditioner without any further treatment. If both grinding and screening are applied the portion of the fine fraction will be increased. On the other side, the portion of the coarse fraction will be decreased. In all cases in which screening takes place it is preferred to treat thermally only the coarse fraction remaining as oversize on the screen. Addition of screening residues which have been obtained during the preparation of the refuse-sludge mixture may be done at this time. Further, a new compacting of the coarse fraction and such residues, if any, can be done before pyrolysis or combustion for better storage on pallets or the like.

So it will be understood that it is preferred to take only the fine fractions along arrow A in the drawing and the coarse fractions along arrow B. However, it is possible of course to adapt to varying demands of the market by increasing and decreasing, respectively, the amounts of material taken along arrows A and B.

The residues of the thermal treatment are both solids and gases.

A simplified material balance taken from tests with compacts produced in accordance with German patent No. 11 45 646 and subjected to pyrolysis shows the following values for rough information:

| Supply of compacts (kilograms) | | 1,000 |
|---|---|---|
| Pyrolysis-drum temperature ($T_{max}$, °C.) | about | 450 |
| Solid residues (kilograms) | about | 690 |
| Gas from pyrolysis (kilograms) | about | 310 |
| Air (kilograms) | about | 522 |
| Wood (kilograms) | about | 20 |
| Gas converter temperature ($T_{max}$, °C.) | about | 1,100 |
| Water (kilograms) | about | 200 |
| Cracked gas (kilograms) | about | 652 |

While specific embodiments of the invention have been shown and described in detail to illustrate the application of the principles of the invention, it will be understood that the invention may be embodied otherwise without departing from such principles.

What is claimed is:

1. A method of producing soil conditioners from waste material, and of utilizing the internal energy thereof, while reducing the volume of the waste material at the same time, wherein initial compacts of a refuse-sewage sludge mixture are subjected to intense rotting whereby the water content thereof is reduced from a value from about 50 to 60% to about 20%, and the compacts become dried and storable, comprising the steps of:
   grinding and screening the dried and storable compacts, with a screen to form a coarse fraction remaining as oversize on the screen and a screened-out fine fraction;
   the screened-out fine fraction being directly usable as a soil conditioner;
   newly compacting the coarse fraction remaining as oversize on the screen; and
   thereafter thermally treating only the newly compacted coarse fraction by one of low-temperature carbonization and combustion.

* * * * *